US011588642B2

(12) United States Patent
Su

(10) Patent No.: US 11,588,642 B2
(45) Date of Patent: Feb. 21, 2023

(54) METHOD AND APPARATUS FOR SHARING AND ACQUIRING INFORMATION

(71) Applicant: SHANGHAI LIANSHANG NETWORK TECHNOLOGY CO., LTD., Shanghai (CN)

(72) Inventor: Yong Su, Shanghai (CN)

(73) Assignee: SHANGHAI LIANSHANG NETWORK TECHNOLOGY CO., LTD., Shanghai (CN)

(*) Notice: Subject to any disclaimer, the term of this patent is extended or adjusted under 35 U.S.C. 154(b) by 172 days.

(21) Appl. No.: 17/072,051

(22) Filed: Oct. 16, 2020

(65) Prior Publication Data
US 2021/0036863 A1 Feb. 4, 2021

Related U.S. Application Data

(63) Continuation of application No. PCT/CN2018/124524, filed on Dec. 27, 2018.

(30) Foreign Application Priority Data

Apr. 17, 2018 (CN) .......................... 201810344527.4

(51) Int. Cl.
H04L 9/32 (2006.01)
H04L 9/06 (2006.01)
(Continued)

(52) U.S. Cl.
CPC .......... H04L 9/3239 (2013.01); H04L 9/0643 (2013.01); H04L 9/3247 (2013.01); H04W 48/20 (2013.01); H04L 9/50 (2022.05)

(58) Field of Classification Search
CPC ....... H04L 9/3239; H04L 9/0643; H04L 9/50; H04L 9/3247; H04W 48/20
See application file for complete search history.

(56) References Cited

U.S. PATENT DOCUMENTS

2017/0116693 A1 4/2017 Rae et al.
2018/0276668 A1* 9/2018 Li .......................... H04L 9/0637

FOREIGN PATENT DOCUMENTS

CN 103458404 A 12/2013
CN 105228126 A 1/2016
(Continued)

Primary Examiner — Elton Williams
(74) Attorney, Agent, or Firm — Bayramoglu Law Offices LLC

(57) ABSTRACT

Embodiments of the present application disclose a method and an apparatus for sharing and acquiring information. A specific implementation of the method for sharing information includes: receiving access information of a wireless access point shared by a first terminal device, where the access information of the wireless access point is included in a connection record generated by the first terminal device; and storing the access information of the wireless access point, and synchronizing the access information of the wireless access point with other nodes of the blockchain. In this implementation, the blockchain stores the access information of the wireless access point, and all nodes of the blockchain store the access information of the wireless access point, thereby improving stability of the stored access information of the wireless access point, and better providing a wireless access service for users.

15 Claims, 5 Drawing Sheets

(51) Int. Cl.
*H04W 48/20* (2009.01)
*H04L 9/00* (2022.01)

(56) References Cited

FOREIGN PATENT DOCUMENTS

| | | | |
|---|---|---|---|
| CN | 105472550 A | 4/2016 | |
| CN | 106789911 A | 5/2017 | |
| CN | 108668277 A | 10/2018 | |
| WO | WO-2019199053 A1 * | 10/2019 | ............. G06Q 30/02 |

* cited by examiner

METHOD AND APPARATUS FOR SHARING AND ACQUIRING INFORMATION

CROSS REFERENCE TO THE RELATED APPLICATIONS

This application is the continuation application of International Application No. PCT/CN2018/124524, filed on Dec. 27, 2018, which is based upon and claims priority to Chinese Patent Application No. 201810344527.4, filed on Apr. 17, 2018, the entire contents of which are incorporated herein by reference.

TECHNICAL FIELD

Embodiments of the present application relates to the field of wireless communications technologies, and in particular, to a method and an apparatus for sharing and acquiring information.

BACKGROUND

With the continuous development of wireless communications technologies, Wireless Fidelity (Wi-Fi) has become an important manner for a user to access a network daily, and also brings great convenience to the user.

Currently, for an encrypted wireless access point, when the user connects to the wireless access point through a wireless access point connection application, a password of the wireless access point inputted by the user may be actively shared to a backend server of the wireless access point connection application for storage while the user successfully connects to the wireless the wireless access point. Then, if other users connect to the wireless access point through the wireless access point connection application, the backend server may send the previously stored password of the wireless access point to other users, so that other users use the received password to connect to the wireless access point.

SUMMARY

Embodiments of the present application provide a method and an apparatus for sharing and acquiring information.

According to a first aspect, the embodiments of the present application provide a method for sharing information, applied to a node of a blockchain, the method including: receiving access information of a wireless access point shared by a first terminal device, where the access information of the wireless access point is included in a connection record generated by the first terminal device; and storing the access information of the wireless access point, and synchronizing the access information of the wireless access point with other nodes of the blockchain.

In some embodiments, after the storing the access information of the wireless access point, and synchronizing the access information of the wireless access point with other nodes of the blockchain, the method includes: sending a first resource to a resource storage address of the first terminal device.

In some embodiments, before the storing the access information of the wireless access point, and synchronizing the access information of the wireless access point with other nodes of the blockchain, the method further includes: acquiring a second resource from a resource storage address of the first terminal device; and storing the second resource, and synchronizing the second resource with other nodes of the blockchain.

In some embodiments, before the storing the access information of the wireless access point, the method further includes: receiving verification information sent by the first terminal device; and generating a verification result based on the verification information.

In some embodiments, the verification information includes a to-be-verified private key signature, and the generating a verification result based on the verification information includes: decrypting the to-be-verified private key signature by using a public key, to obtain a decryption result; and generating the verification result based on the decryption result.

In some embodiments, the verification information further includes to-be-paid information, and the generating the verification result based on the decryption result includes: verifying the to-be-paid information by using preset to-be-collected information if the decryption result includes a resource storage address of the first terminal device, to generate the verification result.

In some embodiments, after the storing the access information of the wireless access point, and synchronizing the access information of the wireless access point with other nodes of the blockchain, the method further includes: receiving a request, sent by a second terminal device, for acquiring the access information of the wireless access point; and sending the access information of the wireless access point to the second terminal device.

In some embodiments, before the sending the access information of the wireless access point to the second terminal device, the method further includes: acquiring a third resource from a resource storage address of the second terminal device, and sending at least a part of the third resource to the resource storage address of the first terminal device.

According to a second aspect, the embodiments of the present application provide a method for sharing information, applied to a first terminal device, the method including: sending a request for connecting to a wireless access point; generating a connection record in response to successfully connecting to the wireless access point, where the connection record includes access information of the wireless access point; and sharing the access information of the wireless access point to a node of a blockchain, so that the node of the blockchain stores the access information of the wireless access point, and synchronizes the access information of the wireless access point with other nodes of the blockchain.

In some embodiments, after the sharing the access information of the wireless access point to a node of a blockchain, the method further includes: acquiring a first resource sent by the node of the blockchain to a resource storage address of the first terminal device, and storing the first resource to the resource storage address of the first terminal device.

In some embodiments, before the acquiring a first resource sent by the node of the blockchain to a resource storage address of the first terminal device, the method further includes: receiving verification information sent by the node of the blockchain; and generating a verification result based on the verification information.

In some embodiments, the verification information includes a to-be-verified private key signature, and the generating a verification result based on the verification information includes: decrypting the to-be-verified private key signature by using a public key, to obtain a decryption result; and generating the verification result based on the decryption result.

In some embodiments, the verification information further includes to-be-paid information, and the generating the verification result based on the decryption result includes: verifying the to-be-paid information by using preset to-be-collected information if the decryption result includes an address of the node in the blockchain, to generate the verification result.

In some embodiments, before the sharing the access information of the wireless access point to a node of a blockchain, the method further includes: sending a second resource from the resource storage address of the first terminal device to the node of the blockchain, so that the node of the blockchain stores the second resource, and synchronizes the second resource with other nodes of the blockchain.

According to a third aspect, the embodiments of the present application provide a method for acquiring information, applied to a second terminal device, the method including: sending a request for acquiring access information of a wireless access point to a node of a blockchain, where the access information of the wireless access point is shared by a first terminal device to the node of the blockchain; and receiving the access information of the wireless access point sent by the node of the blockchain.

In some embodiments, before the receiving the access information of the wireless access point sent by the node of the blockchain, the method further includes: paying a third resource from a resource storage address of the second terminal device to the node of the blockchain, so that the node of the blockchain sends at least a part of the third resource to a resource storage address of the first terminal device.

In some embodiments, after the receiving the access information of the wireless access point sent by the node of the blockchain, the method further includes: connecting to the wireless access point by using the access information of the wireless access point.

According to a second aspect, the embodiments of the present application provide a method for sharing information, the method including: sending, by a first terminal device, a request for connecting to a wireless access point, generating a connection record including access information of the wireless access point in response to successfully connecting to the wireless access point, and sharing the access information of the wireless access point to a node of a blockchain; storing, by the node of the blockchain, the access information of the wireless access point, and synchronizing the access information of the wireless access point with other nodes of the blockchain; sending, by a second terminal device, a request for acquiring the access information of the wireless access point to the node of the blockchain; and sending, by the node of the blockchain, the access information of the wireless access point to the second terminal device.

According to a fifth aspect, the embodiments of the present application provide a node of a blockchain. The node of the blockchain includes: one or more processors; and a storage apparatus, configured to store one or more programs, the one or more programs, when executed by the one or more processors, causing the one or more processors to implement the method according to any implementation in the first aspect.

According to a sixth aspect, the embodiments of the present application provide a first terminal device. The first terminal device includes: one or more processors; and a storage apparatus, configured to store one or more programs, the one or more programs, when executed by the one or more processors, causing the one or more processors to implement the method according to any implementation in the second aspect.

According to a seventh aspect, the embodiments of the present application provide a second terminal device. The second terminal device includes: one or more processors; and a storage apparatus, configured to store one or more programs, the one or more programs, when executed by the one or more processors, causing the one or more processors to implement the method according to any implementation in the third aspect.

According to an eighth aspect, the embodiments of the present application provide a computer-readable medium, storing a computer program, the computer program, when executed by a processor, implementing the method according to any implementation in the first aspect, or the method according to any implementation in the second aspect, or the method according to any implementation in the third aspect.

According to the method and apparatus for sharing and acquiring information provided in this embodiment of the present application, when the access information of the wireless access point shared by the first terminal device is received, the access information of the wireless access point is stored, and the access information of the wireless access point is synchronized with other nodes of the blockchain. The blockchain stores the access information of the wireless access point, and all nodes of the blockchain store the access information of the wireless access point. When a fault occurs in a node of the blockchain, other nodes continuously provide a service without being affected, thereby improving stability of the stored access information of the wireless access point, and better providing the wireless access service for users.

BRIEF DESCRIPTION OF THE DRAWINGS

Other features, objectives, and advantages of the present application become more obvious by reading the detailed description of non-limiting embodiments that is provided with reference to the following accompanying drawings.

DETAILED DESCRIPTION OF THE EMBODIMENTS

The present application is further described in detail below with reference to the accompanying drawings and embodiments. It may be understood that, the specific embodiments described herein are merely used for illustrating a related invention, but are not limited to the invention. In addition, it should be noted that, for ease of description, the accompanying drawings only show parts relevant to the related invention.

It should be noted that the embodiments in the present application and features in the embodiments can be combined with each other in the case of no conflict. The present application is described in detail below with reference to the accompanying drawings and the embodiments.

Figure 1:
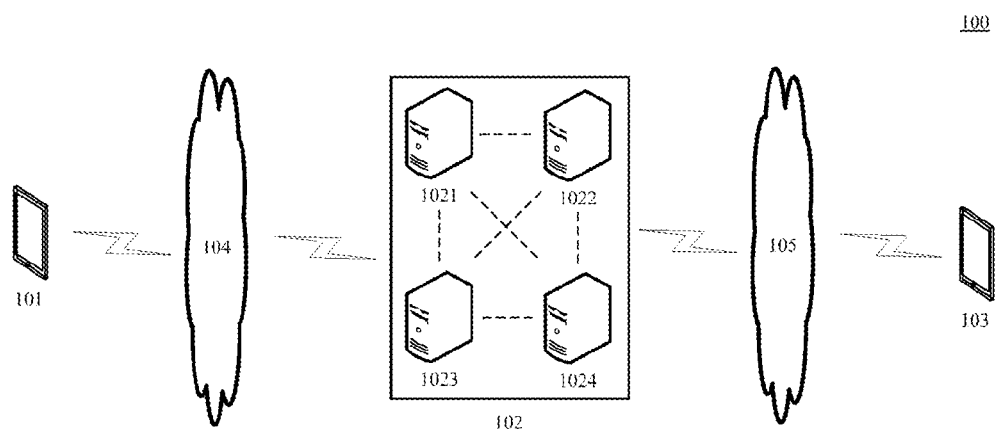
FIG. 1 is a diagram of an exemplary system architecture to which the present application may be applied.

FIG. 1 shows an exemplary system architecture 100 to which embodiments of a method for sharing and acquiring information of the present application may be applied.

As shown in FIG. 1, the system architecture 100 may include a first terminal device 101, a blockchain 102, a second terminal device 103, and networks 104 and 105. The blockchain 102 may include nodes 1021, 1022, 1023, and 1024. The network 104 is a medium configured to provide a communication link between the first terminal device 101 and the blockchain 102. The network 105 is a medium configured to provide a communication link between the blockchain 102 and the second terminal device 103. The networks 104 and 105 may include various connection types, such as a wired or wireless communication link, or a fiber optic cable.

A user may use the first terminal device 101 to interact with the blockchain 102 through the network 104, to receive or send a message or the like. The user may further use the second terminal device 103 to interact with the blockchain 102 through the network 105. Various communication client applications, for example, a wireless access point connection application, may be installed on the first terminal device 101 and the second terminal device 103.

The first terminal device 101 and the second terminal device 103 may be hardware or software. When the first terminal device 101 and the second terminal device 103 are hardware, the hardware may be various electronic devices supporting connection to the wireless access point, including but not limited to a smart phone, a tablet computer, a laptop portable computer, a desktop computer, and the like. When the first terminal device 101 and the second terminal device 103 are software, the first terminal device and the second terminal device may be installed in the electronic devices described above. The first terminal device and the second terminal device may be implemented as a plurality of software or software modules, or may be implemented as a single software or software module, which is not specifically limited herein.

The blockchain 102 may provide various services. For example, a node (for example, a node 1021) in the blockchain 102 may store access information of the wireless access point received by the first terminal device 101, and synchronize the access information of the wireless access point with other nodes (for example, nodes 1022, 1023, and 1024) in the blockchain 102. In addition, the node in the blockchain 102 may further receive a request, sent by the second terminal device 103, for acquiring the access information of the wireless access point, and send the access information of the wireless access point to the second terminal device 103.

It should be noted that, the method for sharing information provided in this embodiment of the present application may be performed by the first terminal device 101 or the blockchain 103, and the method for acquiring information may be performed by the second terminal device 103.

It should be understood that, the quantities of first terminal devices, blockchains, second terminal devices, networks, and nodes in the blockchain in FIG. 1 are an example. According to actual requirements, there may be any quantities of first terminal devices, blockchains, second terminal devices, networks, and nodes in the blockchain.

Figure 2:
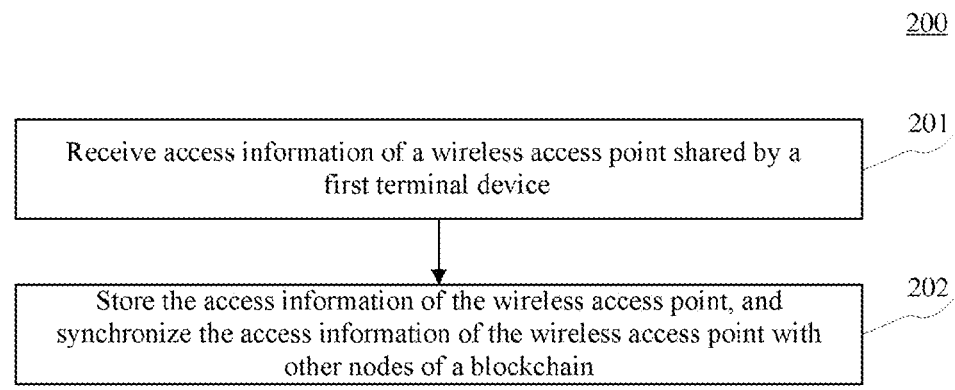
FIG. 2 is a flowchart of an embodiment of a method for sharing information according to the present application.

FIG. 2 shows a procedure 200 of an embodiment of a method for sharing information according to the present application. The method for sharing information is applied to a node of a blockchain. The method includes the following steps:

Step 201. Receive access information of a wireless access point shared by the first terminal device.

In this embodiment, the node of the blockchain (for example, the node 1021 of the blockchain 102 shown in FIG. 1) on which the method for sharing information runs may acquire the access information of the wireless access point from the first terminal device (for example, the first terminal device 101 shown in FIG. 1) in a wired or wireless connection manner. Generally, the wireless access point herein is an encrypted wireless access point. That is, a password is required to successfully connect to the wireless access point. In addition, the access information of the encrypted wireless access point is not stored in the blockchain yet. The access information of the wireless access point may be information used for connecting to the wireless access point, including but not limited to an identifier of the wireless access point, an encryption type of the wireless access point, and a password of the wireless access point. The identifier of the wireless access point may include, but is not limited to a service set identifier (SSID), or a basic service set identifier (BSSID). The encryption type of the wireless access point may include, but is not limited to Wi-Fi protected access (WPA), or wired equivalent privacy (WEP).

In practice, a connection record generated by the first terminal device may include the access information of the wireless access point. Specifically, when the user opens a wireless local area networks (WLAN) option in settings of the first terminal device, or runs a wireless access point connection application installed on the terminal device, a list of wireless access points near the first terminal device may be displayed on a screen interface of the first terminal device. After clicking an encrypted wireless access point in the list, the user is prompted to input a password of the encrypted wireless access point. After the user inputs the password, the first terminal device may be triggered to send, to a router, a request for connecting to the encrypted wireless access point. If the password inputted by the user is correct, the router may grant the first terminal device a permission to connect to the encrypted wireless access point. In this case, the first terminal device may successfully connect to the encrypted wireless access point, and generate a connection record including the access information of the wireless access point.

Step 202. Store the access information of the wireless access point, and synchronize the access information of the wireless access point with other nodes of the blockchain.

In this embodiment, when receiving the access information of the wireless access point, the node of the blockchain may store the access information of the wireless access point, and synchronize the access information of the wireless access point with other nodes of the blockchain (for example, the nodes 1022, 1023, and 1024 of the blockchain 102 shown in FIG. 1). The blockchain is a new application mode of computer technologies such as distributed data storage, point-to-point transmission, a consensus mechanism, and an encryption algorithm. The blockchain is a decentralized database, and includes a plurality of nodes. Anyone may set up a server, and joins a blockchain network, to become a node. When content stored in one node in the blockchain changes, the content stored in the node is synchronized with other nodes in the blockchain. The node of the blockchain herein may be any node in the blockchain.

In some optional implementations of this embodiment, to encourage the user to share the access information of the wireless access point, after the first terminal device successfully shares the access information of the wireless access point, the node of the blockchain may further send the first resource to a resource storage address of the first terminal device. In this way, the first resource is stored in the resource storage address of the first terminal device. The first terminal device may be integrated with a blockchain wallet, which has a right to pay and charge blockchain tokens. The resource storage address of the first terminal device may be an address of the blockchain wallet integrated in the first terminal device. The first resource may be a preset amount of blockchain tokens. The blockchain tokens may include, but are not limited to, a Bitcoin, an ether, and the like. In practice, both transaction parties may preset some protocols in a smart contract. For example, after the first terminal device successfully shares the access information of the wireless access point, the node of the blockchain needs to pay the preset amount of blockchain tokens (for example, 0.01 ETH) to the blockchain wallet integrated in the first terminal device. The smart contract is a set of promises defined in a digital form, including the protocols on which contract participants (for example, the first terminal device and the node of the blockchain) may execute the promises. The smart contract is essentially executable computer code, and a working principle thereof is similar to if-then statements of other computer programs. The smart contract only interacts with assets in the real world in such a manner. When a pre-programmed condition is triggered, a corresponding contract term in the smart contract is executed. A specific reward is paid to the user who successfully shares the access information of the wireless access point, so that a share rate of the access information of the wireless access point can be improved.

In some optional implementations of this embodiment, to prevent the user from sharing false access information of the wireless access point, before the first terminal device successfully shares the access information of the wireless access point, the node of the blockchain needs to acquire a second resource from the resource storage address of the first terminal device. After acquiring the second resource, the node of the blockchain may store the second resource, and synchronize the second resource with other nodes of the blockchain. The second resource may be optionally a preset amount of blockchain tokens. In practice, both transaction parties may preset some protocols in a smart contract. For example, before the node of the blockchain stores the information of the wireless access point, the node of the blockchain needs to charge the preset amount of blockchain tokens from the blockchain wallet integrated in the first terminal device. The user needs to pay a specific fee to share the access information of the wireless access point, thereby greatly reducing sharing of false access information.

In some optional implementations of this embodiment, before storing the access information of the wireless access point, the node of the blockchain may first receive verification information sent by the first terminal device, and then generate a verification result based on the verification information. Generally, when the verification result indicates that the verification succeeds, the node of the blockchain may store the access information of the wireless access point. Generally, the verification information may include a to-be-verified private key signature. The to-be-verified private key signature herein may be a private key signature corresponding to the address of the blockchain wallet integrated in the first terminal device, that is, a private key signature obtained by encrypting the address of the blockchain wallet integrated in the first terminal device with a private key. Optionally, the verification information may further include to-be-paid information. The to-be-paid information may be information of blockchain tokens to be paid by the blockchain wallet integrated in the first terminal device. In a special case, if the blockchain wallet integrated in the first terminal device does not need to pay blockchain tokens to the node of the blockchain, the verification information may not include the to-be-paid information, or the amount of blockchain tokens to be paid in the to-be-paid information is zero.

In some optional implementations of this embodiment, the node of the blockchain may first decrypt the to-be-verified private key signature by using a public key, to obtain a decryption result. The verification information may include a to-be-verified private key signature. The to-be-verified private key signature may be a private key signature corresponding to the address of the blockchain wallet integrated in the first terminal device. The public key may be a public key corresponding to the address of the blockchain wallet integrated in the first terminal device. In practice, the to-be-verified private key signature is decrypted by using the public key, to decrypt the address of the blockchain wallet integrated in the first terminal device, so that the node of the blockchain has the right to acquire the blockchain tokens from the address of the blockchain wallet integrated in the first terminal device. Then, the node of the blockchain may generate the verification result based on the decryption result. For example, if the decryption result includes the address of the blockchain wallet integrated in the first terminal device, the verification result indicates that the verification succeeds; otherwise, the verification result indicates that the verification fails.

In addition, the verification information may further include the to-be-paid information. In this way, after decrypting the address of the blockchain wallet integrated in the first terminal device, the node of the blockchain may further verify the to-be-paid information by using the preset to-be-collected information. Specifically, the node of the blockchain may determine whether the to-be-collected information matches the to-be-paid information. For example, it is determined whether the amount of blockchain tokens in the to-be-collected information is equal to the amount of blockchain tokens in the to-be-paid information. If the amount of blockchain tokens in the to-be-collected information is equal to the amount of blockchain tokens in the to-be-paid information, the to-be-collected information matches the to-be-paid information, and the verification result indicates that the verification succeeds; otherwise, the to-be-collected information does not match the to-be-paid information, and the verification result indicates that the verification fails. The to-be-paid information may be information of blockchain tokens to be paid by the blockchain wallet integrated in the first terminal device. The to-be-collected information may be information of the blockchain tokens to be charged by the node of the blockchain.

It should be noted that, because the blockchain includes a plurality of nodes, the verification information may be verified only by the node of the blockchain that receives the verification information sent by the first terminal device, or may be verified by other nodes of the blockchain simultaneously. When the verification information needs to be verified by other nodes of the blockchain simultaneously, the node of the blockchain that receives the verification information sent by the first terminal device only needs to broadcast the verification information to other nodes of the blockchain. Specific operations of verifying the verification information by the node of the blockchain that receives the verification information sent by the first terminal device are basically the same as specific operations of verifying the verification information by other nodes of the blockchain. Details are not described herein again.

Figure 3:
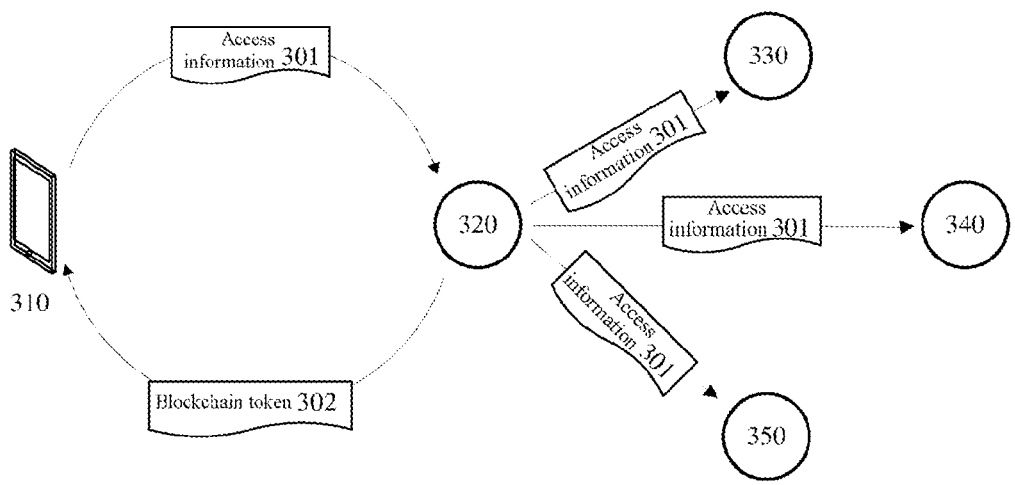
FIG. 3 is a schematic diagram of an application scenario of the method for sharing information provided in FIG. 2.

FIG. 3 is a schematic diagram of an application scenario of the method for sharing information provided in FIG. 2. In the application scenario of FIG. 3, after successfully connecting to the wireless access point by using the first terminal device 310, the user may share access information 301 of the wireless access point in the generated connection record to a node 320 of the blockchain. Then, the node 320 of the blockchain may store the access information 301, and synchronize the access information 301 with other nodes 330, 340, and 350 of the blockchain. Then, the node 320 of the blockchain may pay a preset amount of blockchain tokens 302 to the blockchain wallet integrated in the first terminal device 310.

Figure 4:
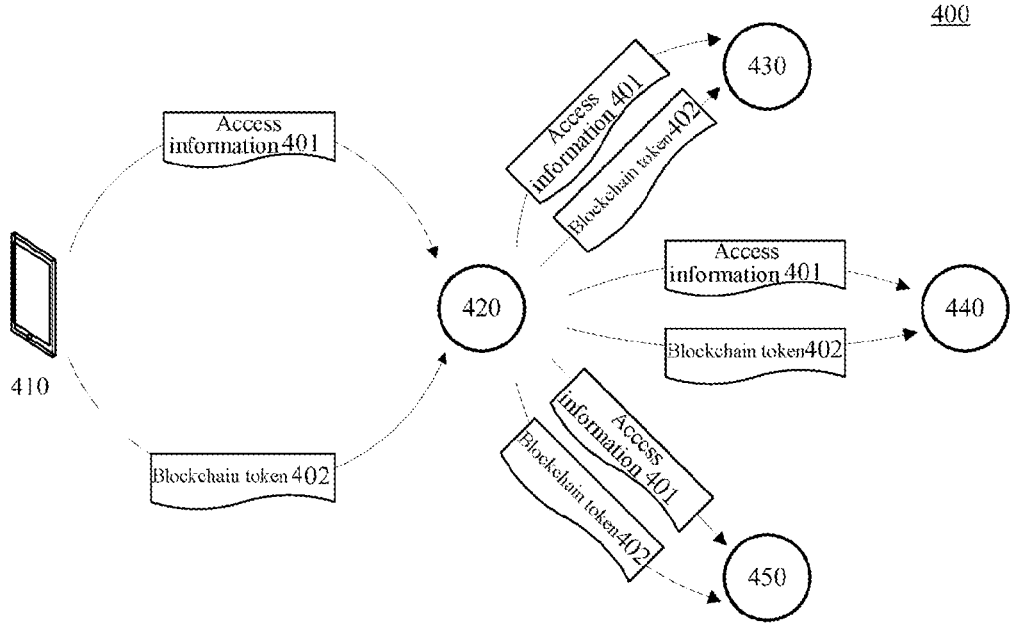
FIG. 4 is a schematic diagram of another application scenario of the method for sharing information provided in FIG. 2.

FIG. 4 is a schematic diagram of another application scenario of the method for sharing information provided in FIG. 2. In the application scenario of FIG. 4, after successfully connecting to the wireless access point by using a first terminal device 410, the user may share access information 401 of the wireless access point in the generated connection record to a node 420 of the blockchain. Then, the blockchain wallet integrated in the first terminal device 410 may pay a preset amount of blockchain tokens 402 to the node 420 of the blockchain. Then, the node 420 of the blockchain may store the blockchain tokens 402, and synchronize the blockchain tokens 402 with other nodes 430, 440, and 450 of the blockchain. Finally, the node 420 of the blockchain may store the access information 401, and synchronize the access information 401 with other nodes 430, 440, and 450 of the blockchain.

According to the method provided in this embodiment of the present application, when access information of a wireless access point shared by a first terminal device is received, the access information of the wireless access point is stored, and the access information of the wireless access point is synchronized with other nodes of a blockchain. The blockchain stores the access information of the wireless access point, and all nodes of the blockchain store the access information of the wireless access point. When a fault occurs in a node of the blockchain, other nodes continuously provide a service without being affected, thereby improving stability of the stored access information of the wireless access point, and better providing the wireless access service for users.

Figure 5:
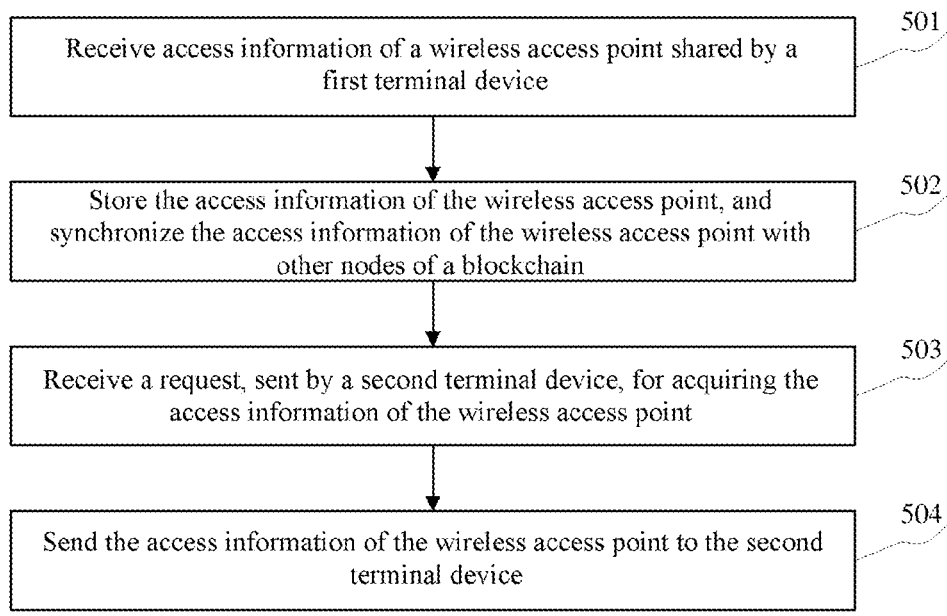
FIG. 5 is a flowchart of another embodiment of a method for sharing information according to the present application.

FIG. 5 shows a procedure 500 of an embodiment of a method for sharing information according to the present application. The method for sharing information is applied to a node of a blockchain. The method includes the following steps:

Step 501. Receive access information of a wireless access point shared by the first terminal device.

Step 502. Store the access information of the wireless access point, and synchronize the access information of the wireless access point with other nodes of the blockchain.

In this embodiment, specific operations of steps 501 and 502 are basically the same as operations of steps 201 and 202 in the embodiment shown in FIG. 2. Details are not described herein again.

Step 503. Receive a request, sent by a second terminal device, for acquiring the access information of the wireless access point.

In this embodiment, the node of the blockchain (for example, the node 1021 of the blockchain 102 shown in FIG. 1) on which the method for sharing information runs may receive, in a wired or wireless connection manner, the request sent by the second terminal device (for example, the second terminal device 103 shown in FIG. 1) for acquiring the access information of the wireless access point. In practice, when the user open a WLAN option in settings of the second terminal device, or runs a wireless access point connection application installed on the second terminal device, a list of wireless access points near the terminal device may be displayed on a screen interface of the second terminal device. When the user clicks the wireless access point in the list, the second terminal device may be triggered to send the request for acquiring the access information of the wireless access point to the node of the blockchain. The access information of the wireless access point requested to be connected by the second terminal device has generally been stored in the blockchain. The node of the blockchain may be any node in the blockchain. Because all nodes in the blockchain store the access information of the wireless access point, the second terminal device may send the request for acquiring the access information of the wireless access point to any node in the blockchain, to acquire the access information of the wireless access point.

Step 504. Send the access information of the wireless access point to the second terminal device.

In this embodiment, after receiving the request for acquiring the access information of the wireless access point, the node of the blockchain may send the access information of the wireless access point stored in the node of the blockchain to the second terminal device, so that the second terminal device can connect to the wireless access point by using the access information of the wireless access point.

In some optional implementations of this embodiment, before sending the access information of the wireless access point to the second terminal device, the node of the blockchain may first acquire a third resource from a resource storage address of the second terminal device, and then send at least a part of the third resource to the resource storage address of the first terminal device. In this way, the at least a part of the third resource may be stored in the resource storage address of the first terminal device. The second terminal device may alternatively be integrated with a blockchain wallet, which has a right to pay and charge blockchain tokens. The resource storage address of the second terminal device may be an address of the blockchain wallet integrated in the second terminal device. The third resource may also be a preset amount of blockchain tokens. In practice, both transaction parties may preset some protocols in a smart contract. For example, after the blockchain wallet integrated in the second terminal device pays the preset amount of blockchain tokens to the blockchain wallet integrated in the first terminal device, the node of the blockchain can send the access information of the wireless access point shared by the first terminal device to the second terminal device. Specifically, after receiving the acquiring request, a second node may execute the smart contract, automatically deduct a corresponding amount of blockchain tokens from the blockchain wallet integrated in the second terminal device, and store the corresponding amount of blockchain tokens to the blockchain wallet integrated in the first terminal device. Then, the second node sends the access information of the wireless access point shared by the first terminal device to the second terminal device. A user who acquires the access information of the wireless access point from the blockchain needs to pay a specific reward to a user who shares the access information of the wireless access point, so that a share rate of the access information of the wireless access point can be further improved.

Figure 6:
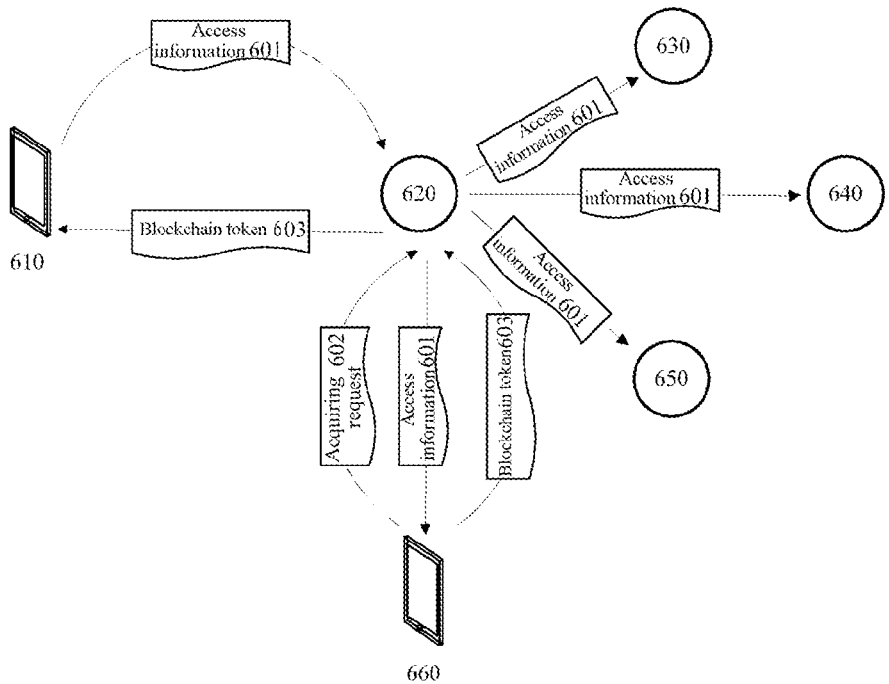
FIG. 6 is a schematic diagram of an application scenario of the method for sharing information provided in FIG. 5.

FIG. 6 is a schematic diagram of an application scenario of the method for sharing information provided in FIG. 5. In the application scenario of FIG. 6, after successfully connecting to the wireless access point by using a first terminal device 610, the user may share access information 601 of the wireless access point in the generated connection record to a node 620 of the blockchain. Then, the node 620 of the blockchain may store the access information 601, and synchronize the access information 601 with other nodes 630, 640, and 650 of the blockchain. Then, the second terminal device 660 may send a request 602 for acquiring the access information 601 of the wireless access point to the node 620 of the blockchain. Then, the node 620 of the blockchain may deduct a preset amount of blockchain tokens 603 from a blockchain wallet integrated in the second terminal device 660, and store the blockchain tokens 603 to a blockchain wallet integrated in the first terminal device 610. Finally, the node 620 of the blockchain may send the access information 601 of the wireless access point to the second terminal device 660, so that the second terminal device 660 connects to the wireless access point by using the access information 601.

It can be learned from FIG. 5 that, compared with the embodiment corresponding to FIG. 2, the procedure 500 of the method for sharing information in this embodiment includes an additional step of sending the access information of the wireless access point to the second terminal device. Therefore, in the solution described in this embodiment, the second terminal device may acquire the access information of the wireless access point from any node in the blockchain, to connect to the wireless access point, so as to better provide a wireless access service for users.

Figure 7:
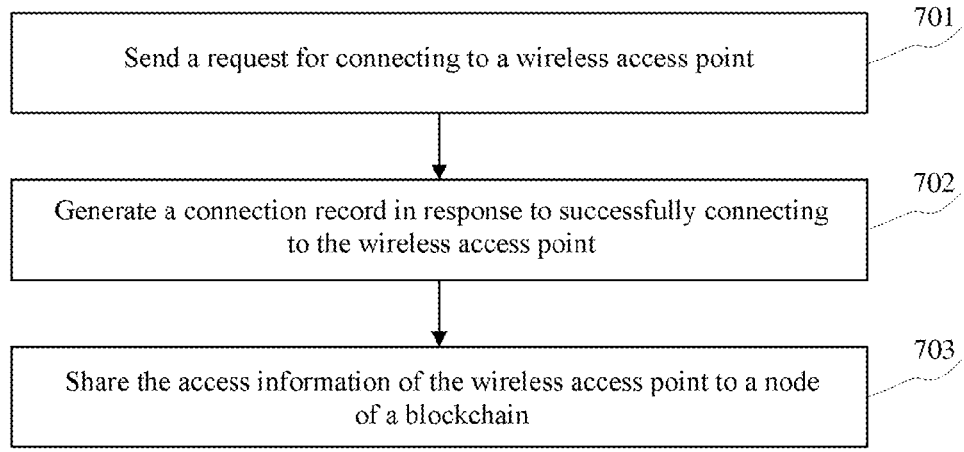
FIG. 7 is a flowchart of another embodiment of a method for sharing information according to the present application.

FIG. 7 shows a procedure 700 of another embodiment of a method for sharing information according to the present application. The method for sharing information is applied to a first terminal device, and includes the following steps:

Step 701. Send a request for connecting to a wireless access point.

In this embodiment, the first terminal device (for example, the first terminal device 101 shown in FIG. 1) on which the method for sharing information runs may send the request for connecting to the wireless access point. Generally, the wireless access point requested to be connected herein is an encrypted wireless access point. That is, a password is required to successfully connect to the wireless access point. In addition, the access information of the encrypted wireless access point is not stored in the blockchain yet.

In practice, when the user opens options in the WLAN in a setting of the first terminal device, or runs a wireless access point application of a connection category installed on the first terminal device, a list of wireless access points nearby the first terminal device may be displayed on a screen interface of the first terminal device. After clicking an encrypted wireless access point in the list, the user is prompted to input a password of the encrypted wireless access point. After the user inputs the password, the first terminal device may be triggered to send, to a router, a request for connecting to the encrypted wireless access point.

Step 702. Generate a connection record in response to successfully connecting to the wireless access point.

In this embodiment, when the wireless access point is successfully connected, the first terminal device may generate the connection record. The connection record may include the access information of the wireless access point. Generally, the access information of the wireless access point may include, but is not limited to at least one of the following: an identifier of the wireless access point, an encryption type of the wireless access point, and a password of the wireless access point. The identifier of the wireless access point may include, but is not limited to: an SSID and a BSSID. The encryption type of the wireless access point may include, but is not limited to: WPA and WEP.

Step 703. Share the access information of the wireless access point to a node of a blockchain, so that the node of the blockchain stores the access information of the wireless access point, and synchronize the access information of the wireless access point with other nodes of the blockchain.

In this embodiment, the first terminal device may share the access information of the wireless access point in the connection record to the node of the blockchain (for example, the node 1021 of the blockchain 102 shown in FIG. 1), so that the node of the blockchain stores the access information of the wireless access point, and synchronizes the access information of the wireless access point to other nodes of the blockchain (for example, the nodes 1022, 1023, and 1024 of the blockchain 102 shown in FIG. 1).

It should be noted that, for a specific process that the blockchain stores the access information of the wireless access point, reference may be made to the embodiment in FIG. 2. Details are not described herein again.

In some optional implementations of this embodiment, to encourage the user to share the access information of the wireless access point, after successfully sharing the access information of the wireless access point, the first terminal device may acquire a first resource sent by the node of the blockchain to a resource storage address of the first terminal device. In this way, the first resource is stored in the resource storage address of the first terminal device. The first terminal device may be integrated with a blockchain wallet, which has a right to pay and charge blockchain tokens. The resource storage address of the first terminal device may be an address of the blockchain wallet integrated in the first terminal device. The first resource may be a preset amount of blockchain tokens. In practice, both transaction parties may preset some protocols in a smart contract. For example, after the first terminal device successfully shares the access information of the wireless access point, the node of the blockchain needs to pay the preset amount of blockchain tokens to the blockchain wallet integrated in the first terminal device. A specific reward is paid to the user who successfully shares the access information of the wireless access point, so that a share rate of the access information of the wireless access point can be improved.

In some optional implementations of this embodiment, before acquiring the first resource sent by the node of the blockchain to the resource storage address of the first terminal device, the first terminal device may first receive verification information sent by the node of the blockchain; and then, generate a verification result based on the verification information. Generally, when the verification result indicates that the verification succeeds, the first terminal device may store the first resource to the resource storage address of the first terminal device. Generally, the verification information may include a to-be-verified private key signature. The to-be-verified private key signature herein may be a private key signature corresponding to an address of the node of the blockchain, that is, a private key signature obtained by encrypting the address of the node of the blockchain with the private key. Optionally, the verification information may further include to-be-paid information. The to-be-paid information may be information of blockchain tokens to be paid by the node of the blockchain. In a special case, if the node of the blockchain does not need to pay blockchain tokens to the blockchain wallet integrated in the first terminal device, the verification information may not include the to-be-paid information, or the amount of blockchain tokens to be paid in the to-be-paid information is zero.

In some optional implementations of this embodiment, the first terminal device may first decrypt the to-be-verified private key signature by using the public key, to obtain a decryption result. The verification information may include the to-be-verified private key signature. The to-be-verified private key signature may be a private key signature corresponding to the address of the node of the blockchain. The public key may be a public key corresponding to the address of the node of the blockchain. In practice, the to-be-verified private key signature is decrypted by using the public key, to decrypt the address of the node of the blockchain, so that the blockchain wallet integrated in the first terminal device has the right to acquire blockchain tokens from the address of the node of the blockchain. Then, the first terminal device may generate the verification result based on the decryption result. For example, if the decryption result includes the address of the node of the blockchain, the verification result indicates that the verification succeeds; otherwise, the verification result indicates that the verification fails.

In addition, the verification information may further include the to-be-paid information. In this way, after decrypting the address of the node of the blockchain, the first terminal device may further verify the to-be-paid information by using the preset to-be-collected information. Specifically, the first terminal device may determine whether the to-be-collected information matches the to-be-paid information. For example, it is determined whether the amount of blockchain tokens in the to-be-collected information is equal to the amount of blockchain tokens in the to-be-paid information. If the amount of blockchain tokens in the to-be-collected information is equal to the amount of blockchain tokens in the to-be-paid information, the to-be-collected information matches the to-be-paid information, and the verification result indicates that the verification succeeds; otherwise, the to-be-collected information does not match the to-be-paid information, and the verification result indicates that the verification fails. The to-be-paid information may be information of blockchain tokens to be paid by the node of the blockchain. The to-be-collected information may be information of the blockchain tokens to be charged by the blockchain wallet integrated in the first terminal device.

In some optional implementations of this embodiment, to prevent the user from sharing false access information of the wireless access point, before the first terminal device successfully shares the access information of the wireless access point, the first terminal device needs to send a second resource from the resource storage address of the first terminal device to the node of the blockchain. After acquiring the second resource, the node of the blockchain may store the second resource, and synchronize the second resource with other nodes of the blockchain. The second resource may be optionally a preset amount of blockchain tokens. In practice, both transaction parties may preset some protocols in a smart contract. For example, before the node of the blockchain stores the information of the wireless access point, the node of the blockchain needs to charge the preset amount of blockchain tokens from the blockchain wallet integrated in the first terminal device. The user needs to pay a specific fee to share the access information of the wireless access point, thereby greatly reducing sharing of false access information.

According to the method for sharing information provided in this embodiment of the present application, first, a request for connecting to a wireless access point is sent; then, when the wireless access point is successfully connected, a connection record including access information of the wireless access point is generated; and finally, the access information of the wireless access point in the connection record is shared to a blockchain for storage. When the wireless access point is successfully connected, the access information of the wireless access point can be shared to the blockchain, thereby ensuring the authenticity and reliability of the access information of the wireless access point shared to the blockchain. In addition, the blockchain stores the access information of the wireless access point, and when a fault occurs in a node of the blockchain, other nodes continuously provide the service without being affected, thereby improving stability of the stored access information of the wireless access point, and better providing the wireless access service for users.

Figure 8:
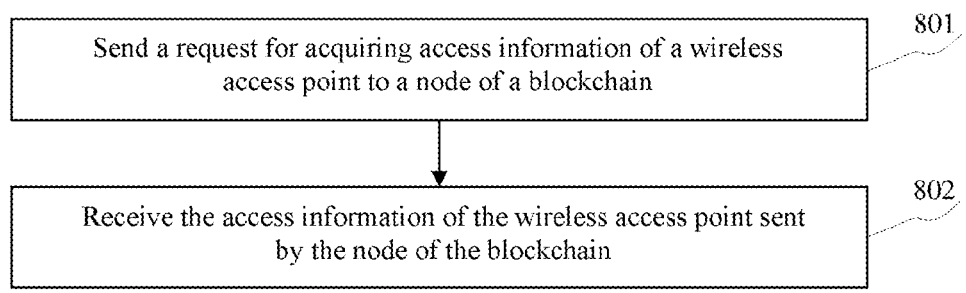
FIG. 8 is a flowchart of an embodiment of a method for acquiring information according to the present application.

FIG. 8 shows a procedure 800 of another embodiment of a method for acquiring information according to the present application. The method for acquiring information is applied to a second terminal device, and includes the following steps:

Step 801. Send a request for acquiring access information of a wireless access point to a node of a blockchain.

In this embodiment, the second terminal device (for example, the second terminal device 103 shown in FIG. 1) on which the method for acquiring information runs may send the request for acquiring the access information of the wireless access point to the node of the blockchain (for example, the node 1021 of the blockchain 102 shown in FIG. 1) in a wired or wireless connection manner. In practice, when the user opens a WLAN option in settings of the second terminal device, or runs a wireless access point connection application installed on the second terminal device, a list of wireless access points near the terminal device may be displayed on a screen interface of the second terminal device. When the user clicks the wireless access point in the list, the second terminal device may be triggered to send the request for acquiring the access information of the wireless access point to the node of the blockchain. The access information of the wireless access point requested to be connected by the second terminal device has generally been stored in the blockchain. The node of the blockchain may be any node in the blockchain. Because all nodes in the blockchain store the access information of the wireless access point, the second terminal device may send the request for acquiring the access information of the wireless access point to any node in the blockchain, to acquire the access information of the wireless access point.

It should be noted that, the access information of the wireless access point herein is shared by a first terminal device (for example, the first terminal device 101 shown in the figure) to the node of the blockchain. For a specific process that the first terminal device shares the access information of the wireless access point, reference may be made to the embodiment in FIG. 7. Details are not described herein again.

Step 802. Receive the access information of the wireless access point sent by the node of the blockchain.

In this embodiment, the node of the blockchain may send the access information of the wireless access point stored in the node of the blockchain to the first terminal device. In this way, the first terminal device connects to the wireless access point by using the access information of the wireless access point.

In some optional implementations of this embodiment, before sending the access information of the wireless access point to the second terminal device, the blockchain wallet integrated in the second terminal device needs to pay a specific reward to the blockchain wallet integrated in the first terminal device. Specifically, the second terminal device may pay a third resource from a resource storage address of the second terminal device to the node of the blockchain, and the node of the blockchain may send at least a part of the third resource to a resource storage address of the first terminal device. In this way, the at least some third resources may be stored in the resource storage address of the first terminal device. The second terminal device may also be integrated with a blockchain wallet, which has a right to pay and charge blockchain tokens. The resource storage address of the second terminal device may be an address of the blockchain wallet integrated in the second terminal device. The third resource may also be a preset amount of blockchain tokens. In practice, both transaction parties may preset some protocols in a smart contract. For example, after the second terminal device pays the preset amount of blockchain tokens to the blockchain wallet integrated in the first terminal device, the node of the blockchain can send the access information of the wireless access point shared by the first terminal device to the second terminal device. Specifically, after receiving the acquiring request, the second node may execute the smart contract, automatically deduct a corresponding amount of blockchain tokens from the blockchain wallet integrated in the second terminal device, and store the corresponding amount of blockchain tokens to the blockchain wallet integrated in the first terminal device. Then, the second node sends the access information of the wireless access point shared by the first terminal device to the second terminal device. A user who acquires the access information of the wireless access point from the blockchain needs to pay a specific reward to a user who shares the access information of the wireless access point, so that a share rate of the access information of the wireless access point can be further improved.

According to the method for acquiring information provided in this embodiment of the present application, first, a request for acquiring access information of a wireless access point is sent to a node of a blockchain; and then, the access information of the wireless access point sent by the node of the blockchain is received. A second terminal device may acquire the access information of the wireless access point from any node in the blockchain, to connect to the wireless access point, so as to better provide a wireless access service for users.

Figure 9:
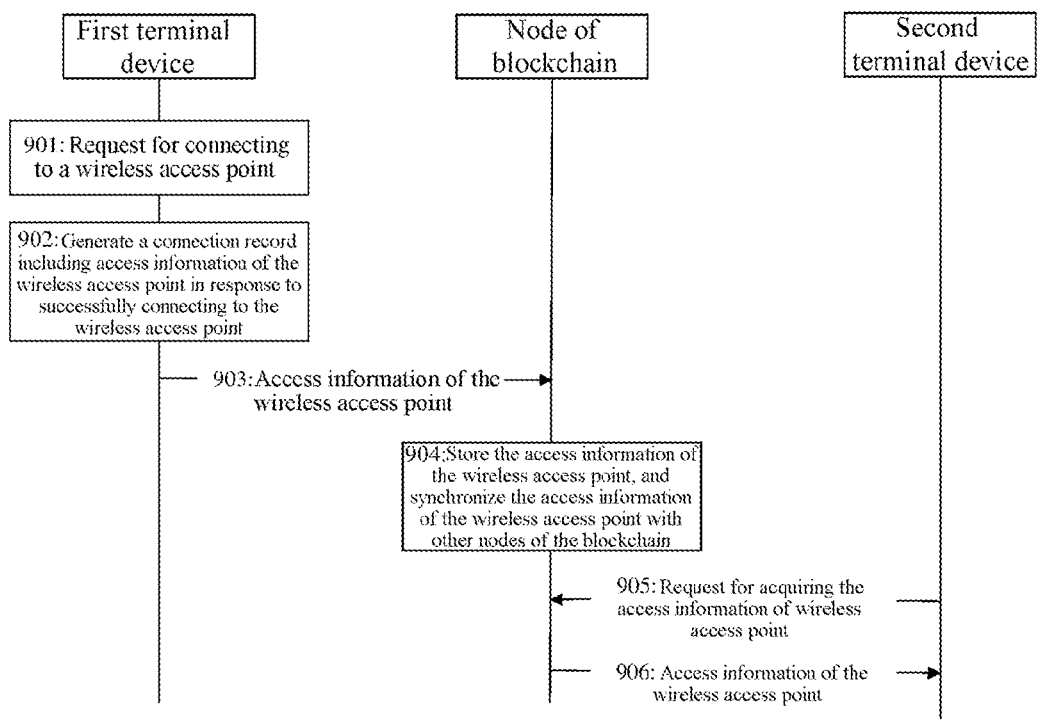
FIG. 9 is a time sequence diagram of yet another embodiment of a method for sharing information according to the present application.

FIG. 9 shows a time sequence 900 of yet another embodiment of a method for sharing information according to the present application. The method for sharing information includes the following steps:

Step 901. A first terminal device sends a request for connecting to a wireless access point.

In this embodiment, the first terminal device (for example, the first terminal device 101 shown in FIG. 1) may send the request for connecting to the wireless access point. Generally, the wireless access point requested to be connected herein is an encrypted wireless access point. That is, a password is required to successfully connect to the wireless access point. In addition, the access information of the encrypted wireless access point is not stored in the blockchain yet.

In practice, when the user opens a WLAN option in settings of the first terminal device, or runs a wireless access point connection application installed on the first terminal device, a list of wireless access points near the first terminal device may be displayed on a screen interface of the first terminal device. After clicking an encrypted wireless access point in the list, the user is prompted to input a password of the encrypted wireless access point. After the user inputs the password, the first terminal device may be triggered to send, to a router, a request for connecting to the encrypted wireless access point.

Step 902. The first terminal device generates a connection record including the access information of the wireless access point in response to successfully connecting to the wireless access point.

In this embodiment, when the wireless access point is successfully connected, the first terminal device may generate the connection record. The connection record may include the access information of the wireless access point. Generally, the access information of the wireless access point may include, but is not limited to at least one of the following: an identifier of the wireless access point, an encryption type of the wireless access point, and a password of the wireless access point. The identifier of the wireless access point may include, but is not limited to: an SSID and a BSSID. The encryption type of the wireless access point may include, but is not limited to: WPA and WEP.

Step 903. The first terminal device shares the access information of the wireless access point to a node of a blockchain.

In this embodiment, the first terminal device may share the access information of the wireless access point in the connection record to the node of the blockchain (for example, the node 1021 of the blockchain 102 shown in FIG. 1).

Step 904. The node of the blockchain stores the access information of the wireless access point, and synchronizes the access information of the wireless access point with other nodes of the blockchain.

In this embodiment, when receiving the access information of the wireless access point, the node of the blockchain (for example, the node 1021 of the blockchain 102 shown in FIG. 1) may store the access information of the wireless access point, and synchronize the access information of the wireless access point with other nodes of the blockchain (for example, the nodes 1022, 1023, and 1024 of the blockchain 102 shown in FIG. 1). The blockchain is a new application mode of computer technologies such as distributed data storage, point-to-point transmission, a consensus mechanism, and an encryption algorithm. The blockchain is a decentralized database, and includes a plurality of nodes. Anyone may set up a server, and joins a blockchain network, to become a node. When content stored in one node in the blockchain changes, the content stored in the node is synchronized with other nodes in the blockchain. The node of the blockchain herein may be any node in the blockchain.

Step 905. The second terminal device sends a request for acquiring the access information of the wireless access point to the node of the blockchain.

In this embodiment, the second terminal device (for example, the second terminal device 103 shown in FIG. 1) may send the request for acquiring the access information of the wireless access point to the node of the blockchain in a wired or wireless connection manner. In practice, when the user opens a WLAN option in settings of the second terminal device, or runs a wireless access point connection application installed on the second terminal device, a list of wireless access points near the terminal device may be displayed on a screen interface of the second terminal device. When the user clicks the wireless access point in the list, the second terminal device may be triggered to send the request for acquiring the access information of the wireless access point to the node of the blockchain.

Step 906. The node of the blockchain sends the access information of the wireless access point to the second terminal device.

In this embodiment, the node of the blockchain may send the access information of the wireless access point stored in the node of the blockchain to the first terminal device. In this way, the first terminal device connects to the wireless access point by using the access information of the wireless access point.

According to the method for sharing information provided in this embodiment of the present application, a first terminal device sends a request for connecting to a wireless access point; when the wireless access point is successfully connected, generates a connection record including the access information of the wireless access point; and shares the access information of the wireless access point in the connection record to a node of a blockchain. The node of the blockchain stores the access information of the wireless access point, and synchronizes the access information of the wireless access point with other nodes of the blockchain. A second terminal device sends a request for acquiring the access information of the wireless access point to the node of the blockchain, receives the access information of the wireless access point sent by the node of the blockchain, and connects to the wireless access point by using the access information of the wireless access point. The blockchain stores the access information of the wireless access point, and when a fault occurs in a node of the blockchain, other nodes continuously provide the service without being affected, thereby improving stability of the stored access information of the wireless access point, and better providing the wireless access service for users.

Figure 10:
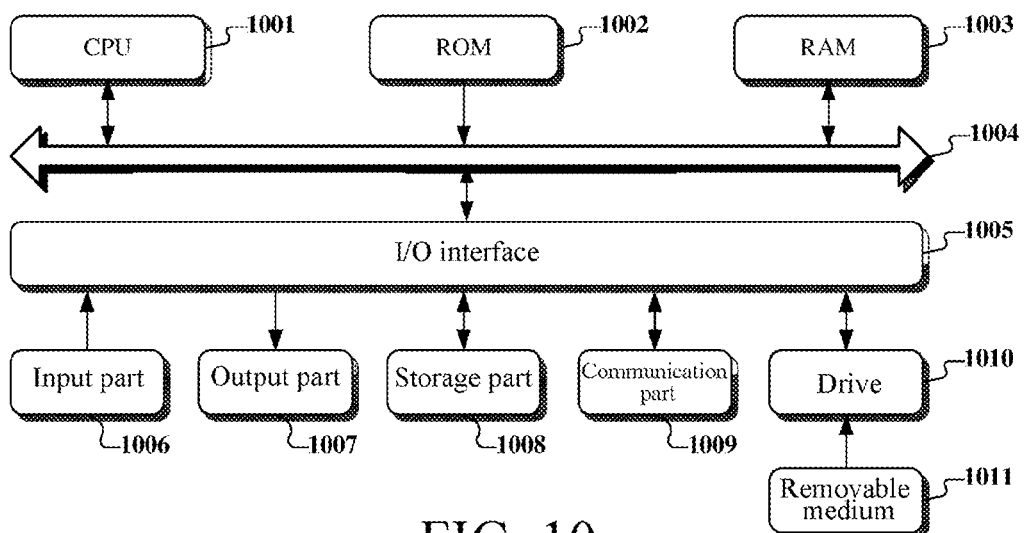
FIG. 10 is a schematic structural diagram of a computer system suitable for implementing a node of a blockchain, a first terminal device, or a second terminal device according to an embodiment of the present application.

FIG. 10 is a schematic structural diagram of a computer system 1000 suitable for implementing a node of a blockchain, a first terminal device, or a second terminal device according to an embodiment of the present application. The node of the blockchain, the first terminal device, or the second terminal device shown in FIG. 10 is merely an example, and should not impose any limitation on functions and use scopes of the embodiments of the present application.

As shown in FIG. 10, the computer system 1000 includes a central processing unit (CPU) 1001, which can perform various proper actions and processing according to a program stored in a read-only memory (ROM) 1002 or a program loaded from a storage part 1008 into a random access memory (RAM) 1003. The RAM 1003 also stores various programs and data required to operate the system 1000. The CPU 1001, the ROM 1002, and the RAM 1003 are connected to each other by using a bus 1004. An input/output (I/O) interface 1005 is also connected to the bus 1004.

Components connected to the I/O interface 1005 are as the following: an input part 1006 including a keyboard, a mouse, or the like; an output part 1007 including a cathode ray tube (CRT), a liquid crystal display (LCD), a speaker, or the like; a storage part 1008 including a hard disk, or the like; and a communication part 1009 including a network interface card such as a LAN card or a modem. The communication part 1009 performs communication processing by using a network such as the Internet. A driver 1010 is also connected to the I/O interface 1005 as required. A removable medium 1011, such as a magnetic disk, an optical disc, a magneto-optical disk, or a semiconductor memory, is installed on the drive 1010 as required, so that a computer program read from the removable medium is installed into the storage part 1008 as required.

In particular, according to the embodiments of the present application, the processes described above with reference to the flowchart may be implemented as a computer software program. For example, the embodiments of the present disclosure include a computer program product, including a computer program carried on a computer readable medium. The computer program includes program code for performing the method shown in the flowchart. In such an embodiment, by using the communication part 1009, the computer program may be downloaded and installed from a network, and/or installed from the removable medium 1011. When the computer program is executed by a CPU 1001, the foregoing functions defined in the method of the present application are executed. It should be noted that, the computer-readable medium in the present application may be a computer-readable signal medium or a computer-readable medium or any combination thereof. The computer-readable medium may be, for example, but is not limited to, an electrical, magnetic, optical, electromagnetic, infrared, or semiconductor system, apparatus, or device, or any combination thereof. A more specific example of the computer-readable medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In the present application, the computer-readable medium may be any tangible medium including or storing a program, and the program may be used by or used in combination with an instruction execution system, apparatus, or device. In the present application, the computer-readable signal medium may include a data signal being in a baseband or propagated as at least a part of a carrier wave, and carries computer-readable program code. Such a propagated data signal may be in a plurality of forms, including but not limited to an electromagnetic signal, an optical signal, or any suitable combination of the above. The computer-readable signal medium may alternatively be any computer-readable medium other than the computer-readable medium.

The computer-readable medium may send, propagate or transmit a program for use by or in combination with an instruction execution system, apparatus or device. The program code contained in the computer-readable medium may be transmitted by using any appropriate medium, including but not limited to: a wireless medium, a wire, an optical cable, RF, any suitable combination thereof, or the like.

One or more programming languages or any combination thereof may be used for writing the computer program code used for performing the operations in the present application. The programming languages include, but are not limited to a target oriented programming language such as Java, Smalltalk, C++, or the like and a conventional procedural programming language, such as "C" language or a similar programming language. The program code may be executed entirely on a computer of a user, partly on the computer of the user, as a stand-alone software package, partly on the computer of the user and partly on a remote computer, or entirely on the remote computer or a server. For the case involving a remote computer, the remote computer may be connected to a computer of a user through any type of network including a local area network (LAN) or a wide area network (WAN), or may be connected to an external computer (for example, through the Internet by using an Internet service provider).

The flowcharts and block diagrams in the accompanying drawings show architectures, functions, and operations that may be implemented for the system, the method, and the computer program product according to the embodiments of the present application. At this point, each block in the flowchart or the block diagram may represent a module, a program segment, or at least a part of code. The module, the program segment, or the part of the code includes one or more executable instructions for implementing a specified logical function. It should also be noted that, in some alternative implementations, functions annotated in boxes may alternatively occur in a sequence different from that annotated in the accompanying drawing. For example, two boxes shown in succession may be actually performed basically in parallel, and sometimes the two boxes may be performed in a reverse sequence. This depends on a related function. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

According to another aspect, the present application further provides a computer-readable medium. The computer-readable medium may be included in the node of the blockchain, the first terminal device, or the second terminal device described in the foregoing embodiments, or may exist alone and is not disposed in the node of the blockchain, the first terminal device, or the second terminal device. The computer-readable medium carries one or more programs. The one or more programs, when being executed by the node of the blockchain, the first terminal device, or the second terminal device, cause the node of the blockchain to: receive access information of a wireless access point shared by a first terminal device, where the access information of the wireless access point is included in a connection record generated by the first terminal device; and store the access information of the wireless access point, and synchronize the access information of the wireless access point with other nodes of the blockchain; cause the first terminal device to: send a request for connecting to a wireless access point; generate a connection record in response to successfully connecting to the wireless access point, where the connection record includes access information of the wireless access point; and share the access information of the wireless access point to a node of a blockchain, so that the node of the blockchain stores the access information of the wireless access point, and synchronizes the access information of the wireless access point with other nodes of the blockchain; and cause the second terminal device to: send a request for acquiring access information of a wireless access point to a node of a blockchain, where the access information of the wireless access point is shared by a first terminal device to the node of the blockchain; and receive the access information of the wireless access point sent by the node of the blockchain.

The foregoing descriptions are merely preferred embodiments of the present application and descriptions of the technical principles used. A person skilled in the art should understand that the scope of the present application is not limited to the technical solutions that are formed by the foregoing particular combinations of technical features, but shall also encompass other technical solutions formed by arbitrarily combining the foregoing technical features or equivalent features thereof without departing from the foregoing inventive concept. For example, technical solutions formed by replacing the foregoing features with technical features having similar functions disclosed in the present application (but not limited thereto) are also included.

What is claimed is:

1. A method for sharing information, applied to a node of a blockchain, the method comprising:
   receiving access information of a wireless access point shared by a first terminal device, wherein the access information of the wireless access point is comprised in a connection record generated by the first terminal device;
   receiving verification information sent by the first terminal device;
   generating a verification result based on the verification information; and
   verifying the verification result, and when the verification result indicates a success, storing the access information of the wireless access point; and synchronizing the access information of the wireless access point with other nodes of the blockchain;
   wherein the verification information comprises a to-be-verified private key signature; and
   the step of generating the verification result based on the verification information comprises:
   decrypting the to-be-verified private key signature by using a public key, to obtain a decryption result; and
   generating the verification result based on the decryption result;
   wherein the to-be-verified private key signature corresponds to an address of a blockchain wallet integrated in the first terminal device, and the to-be-verified private key signature is obtained by encrypting the address of the blockchain wallet integrated in the first terminal device with a private key.

2. The method according to claim 1, wherein after storing the access information of the wireless access point, and synchronizing the access information of the wireless access point with the other nodes of the blockchain, the method further comprises:
   sending a first resource to a resource storage address of the first terminal device.

3. The method according to claim 1, wherein before storing the access information of the wireless access point, and synchronizing the access information of the wireless access point with the other nodes of the blockchain, the method further comprises:

acquiring a second resource from a resource storage address of the first terminal device; and storing the second resource, and synchronizing the second resource with the other nodes of the blockchain.

4. The method according to claim 1, wherein the verification information further comprises to-be-paid information; and the step of generating the verification result based on the decryption result comprises:

verifying the to-be-paid information by using preset to-be-collected information if the decryption result comprises a resource storage address of the first terminal device, to generate the verification result.

5. The method according to claim 1, wherein after storing the access information of the wireless access point, and synchronizing the access information of the wireless access point with the other nodes of the blockchain, the method further comprises:

receiving a request sent by a second terminal device, for acquiring the access information of the wireless access point; and sending the access information of the wireless access point to the second terminal device.

6. The method according to claim 5, wherein before sending the access information of the wireless access point to the second terminal device, the method further comprises:

acquiring a third resource from a resource storage address of the second terminal device, and sending at least a part of the third resource to a resource storage address of the first terminal device.

7. A method for sharing information, applied to a first terminal device, the method comprising:

sending a request for connecting to a wireless access point;

generating a connection record in response to successfully connecting to the wireless access point, wherein the connection record comprises access information of the wireless access point;

sharing the connection record comprising the access information of the wireless access point to a node of a blockchain; and sending verification information to the node of the blockchain;

wherein the verification information is used by the node of the blockchain for generating a verification result, and when the verification result indicates a success, enables the node of the blockchain to store the access information of the wireless access point and synchronizing the access information of the wireless access point with other nodes of the blockchain;

wherein the verification information comprises a to-be-verified private key signature; and the step of generating the verification result based on the verification information comprises:

decrypting the to-be-verified private key signature by using a public key, to obtain a decryption result; and generating the verification result based on the decryption result;

wherein the to-be-verified private key signature corresponds to an address of a blockchain wallet integrated in the first terminal device, and the to-be-verified private key signature is obtained by encrypting the address of the blockchain wallet integrated in the first terminal device with a private key.

8. The method according to claim 7, wherein after sharing the connection record comprising the access information of the wireless access point to the node of the blockchain, the method further comprises:

acquiring a first resource sent by the node of the blockchain to a resource storage address of the first terminal device, and storing the first resource to the resource storage address of the first terminal device.

9. The method according to claim 8, wherein before acquiring the first resource sent by the node of the blockchain to the resource storage address of the first terminal device, the method further comprises:

receiving, by the first terminal device, second verification information sent by the node of the blockchain; and generating, by the first terminal device, a second verification result based on the second verification information.

10. The method according to claim 9, wherein the second verification information comprises a to-be-verified private key signature; and the step of generating the second verification result based on the second verification information comprises:

decrypting the to-be-verified private key signature by using a second public key, to obtain a second decryption result; and generating the second verification result based on the second decryption result.

11. The method according to claim 7, wherein the verification information further comprises to-be-paid information; and the step of generating the verification result based on the decryption result comprises:

verifying the to-be-paid information by using preset to-be-collected information if the decryption result comprises an address of the node in the blockchain, to generate the verification result.

12. The method according to claim 7, wherein before sharing the connection record comprising the access information of the wireless access point to the node of the blockchain, the method further comprises:

sending a second resource from a resource storage address of the first terminal device to the node of the blockchain, so that the node of the blockchain stores the second resource, and synchronizes the second resource with the other nodes of the blockchain.

13. A method for acquiring information, applied to a second terminal device, the method comprising:

sending a request for acquiring access information of a wireless access point to a node of a blockchain, wherein the access information of the wireless access point is comprised in a connection record generated by a first terminal device and shared by the first terminal device to the node of the blockchain; and receiving the access information of the wireless access point sent by the node of the blockchain;

wherein the access information of the wireless access point is stored by the node of the blockchain and synchronized with other nodes of the blockchain after a success indication of a verification result generated from verification information sent by the first terminal device;

wherein the verification information comprises a to-be-verified private key signature; and the step of generating the verification result based on the verification information comprises:

decrypting the to-be-verified private key signature by using a public key, to obtain a decryption result; and generating the verification result based on the decryption result;

wherein the to-be-verified private key signature corresponds to an address of a blockchain wallet integrated in the first terminal device, and the to-be-verified private key signature is obtained by encrypting the address of the blockchain wallet integrated in the first terminal device with a private key.

14. The method according to claim 13, wherein before receiving the access information of the wireless access point sent by the node of the blockchain, the method further comprises:

sending a third resource from a resource storage address of the second terminal device to the node of the blockchain, so that the node of the blockchain sends at least a part of the third resource to a resource storage address of the first terminal device.

15. The method according to claim 13, wherein after receiving the access information of the wireless access point sent by the node of the blockchain, the method further comprises:

connecting to the wireless access point by using the access information of the wireless access point.

* * * * *